US012675685B2

(12) United States Patent (10) Patent No.: US 12,675,685 B2
Rathi et al. (45) Date of Patent: Jul. 7, 2026

(54) DISTRIBUTED FAULT DETECTION

(71) Applicant: Dell Products, L.P., Round Rock, TX (US)

(72) Inventors: Pulkit Rathi, Bhopal (IN); Ian Roche, Glanmire (IE); Daniel Barrett, Moore, OK (US)

(73) Assignee: Dell Products L.P., Round Rock, TX (US)

( * ) Notice: Subject to any disclaimer, the term of this patent is extended or adjusted under 35 U.S.C. 154(b) by 1076 days.

(21) Appl. No.: 17/477,493

(22) Filed: Sep. 16, 2021

(65) Prior Publication Data

US 2023/0079908 A1 Mar. 16, 2023

(51) Int. Cl.
*G06N 3/08* (2023.01)
*G06F 11/07* (2006.01)
*G06F 18/214* (2023.01)
*G06N 3/045* (2023.01)
*G06N 3/063* (2023.01)

(52) U.S. Cl.
CPC ........... *G06N 3/08* (2013.01); *G06F 11/0709* (2013.01); *G06F 18/214* (2023.01); *G06N 3/045* (2023.01); *G06N 3/063* (2013.01)

(58) Field of Classification Search
CPC .......... G06N 3/08; G06N 3/045; G06N 3/063; G06F 18/214; G06F 11/0709
See application file for complete search history.

(56) References Cited

U.S. PATENT DOCUMENTS

| | | | | |
|---|---|---|---|---|
| 8,819,236 | B2 * | 8/2014 | Gkantsidis | .............. H04L 51/42 |
| | | | | 709/200 |
| 10,659,490 | B1 * | 5/2020 | Ryon | ................. G05B 23/0235 |
| 11,046,330 | B1 * | 6/2021 | Katzourakis | .......... B60W 10/20 |
| 2014/0316743 | A1 * | 10/2014 | Drees | ................ H02J 13/00016 |
| | | | | 702/183 |

(Continued)

OTHER PUBLICATIONS

Peng et al., "A Novel Fault Detection and Diagnosis Method Based on Gaussian-Bernoulli Restricted Boltzmann Machine," 2019, 2019 IEEE International Conference on Systems, Man and Cybernetics (SMC) (Year: 2019).*

(Continued)

*Primary Examiner* — Michael J Huntley
*Assistant Examiner* — Vincent Anton Spraul
(74) *Attorney, Agent, or Firm* — Amin, Turocy & Watson, LLP

(57) ABSTRACT
A first computing node of a system can receive sensor data about a physical environment. The first computing node can analyze the sensor data with a restricted Boltzmann machine (RBM) neural network to determine whether there is a fault condition in the physical environment, an identification of the fault condition being omitted from data used to train the RBM neural network. The first computing node can update the RBM neural network based on the sensor data to produce a first updated RBM neural network. The first computing node can send a first patch indicative of the first updated RBM neural network to a central server. The first computing node can receive, from the central server, information indicative of a second updated RBM neural network, the second updated RBM neural network being based on an aggregation of the first patch and of a second patch generated by a second computing node.

20 Claims, 10 Drawing Sheets

(56) References Cited

U.S. PATENT DOCUMENTS

| | | | | |
|---|---|---|---|---|
| 2017/0255191 | A1* | 9/2017 | Maier | G05B 19/058 |
| 2019/0050515 | A1* | 2/2019 | Su | G06N 3/045 |
| 2020/0326257 | A1* | 10/2020 | Szurley | G01M 3/243 |
| 2020/0387539 | A1* | 12/2020 | Ananthanarayanan | |
| | | | | G06F 16/7837 |
| 2021/0174198 | A1* | 6/2021 | Nicodemus | G06V 30/10 |
| 2022/0351744 | A1* | 11/2022 | Krishnan | G06N 3/0475 |

OTHER PUBLICATIONS

Wang et al., "Efficient federated learning for fault diagnosis in industrial cloud-edge computing," 2021, https://doi.org/10.1007/s00607-021-00970-6 (hereafter Wang) (Year: 2021).*

Debouk et al., "Coordinated Decentralized Protocols for Failure Diagnosis of Discrete Event Systems," 1999, Proceedings of the IEEE Conference on Decision and Control, Jan. 1999 (Year: 1999).*

Welsford, "Actuators explained: Types of actuators, application choice, maintenance," Aug. 2021, p. 2, https://www.controleng.com/articles/actuators-explained-types-of-actuators-application-choice-maintenance/ (Year: 2021).*

Kim et al., "Discriminative Restricted Boltzmann Machine for Emergency Detection on Healthcare Robot," 2017 IEEE International Conference on Big Data and Smart Computing (Year: 2017).*

Zhong et al., "Merging Similar Neurons for Deep Networks Compression," 2020, https://doi.org/10.1007/s12559-019-09703-6 (Year: 2020).*

* cited by examiner

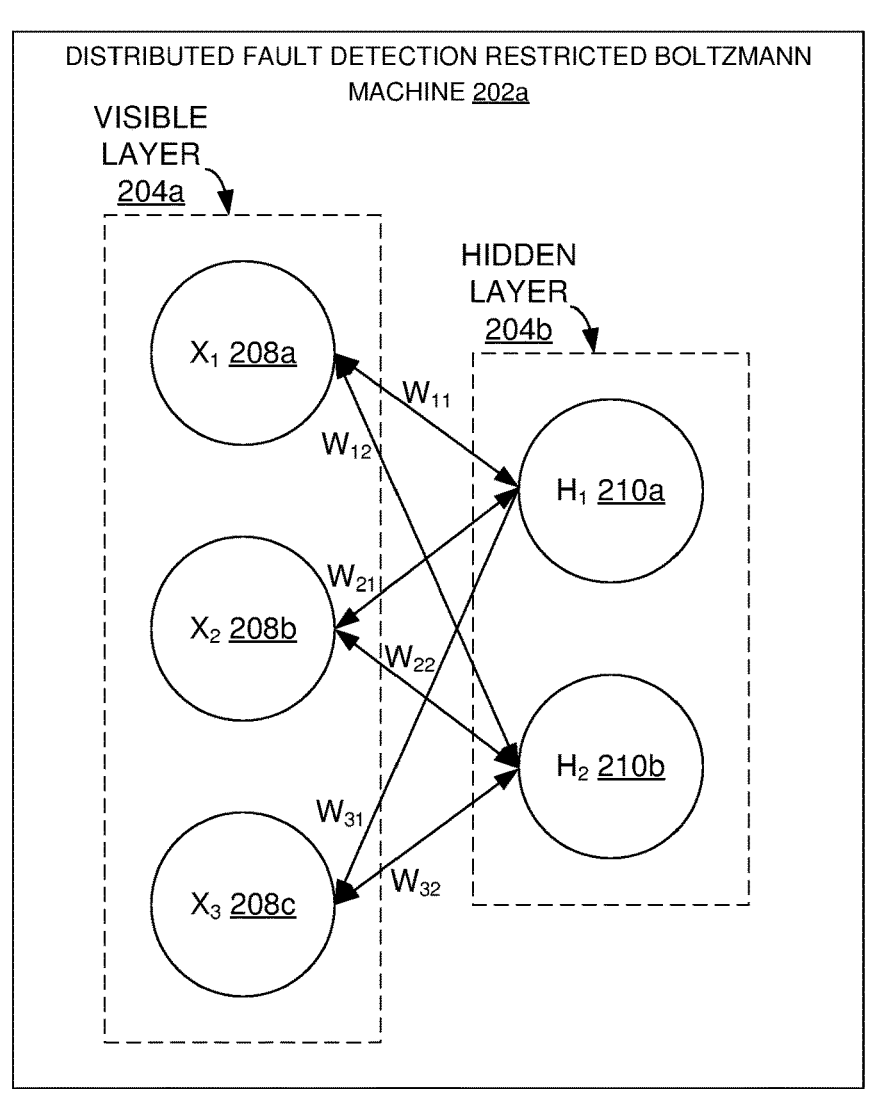
FIG. 2

300

302

RECEIVE DATA FROM SENSORS 304

UPDATE A MODEL BASED ON THE DATA 306

SEND A PATCH TO A CENTRAL SERVER 308

310

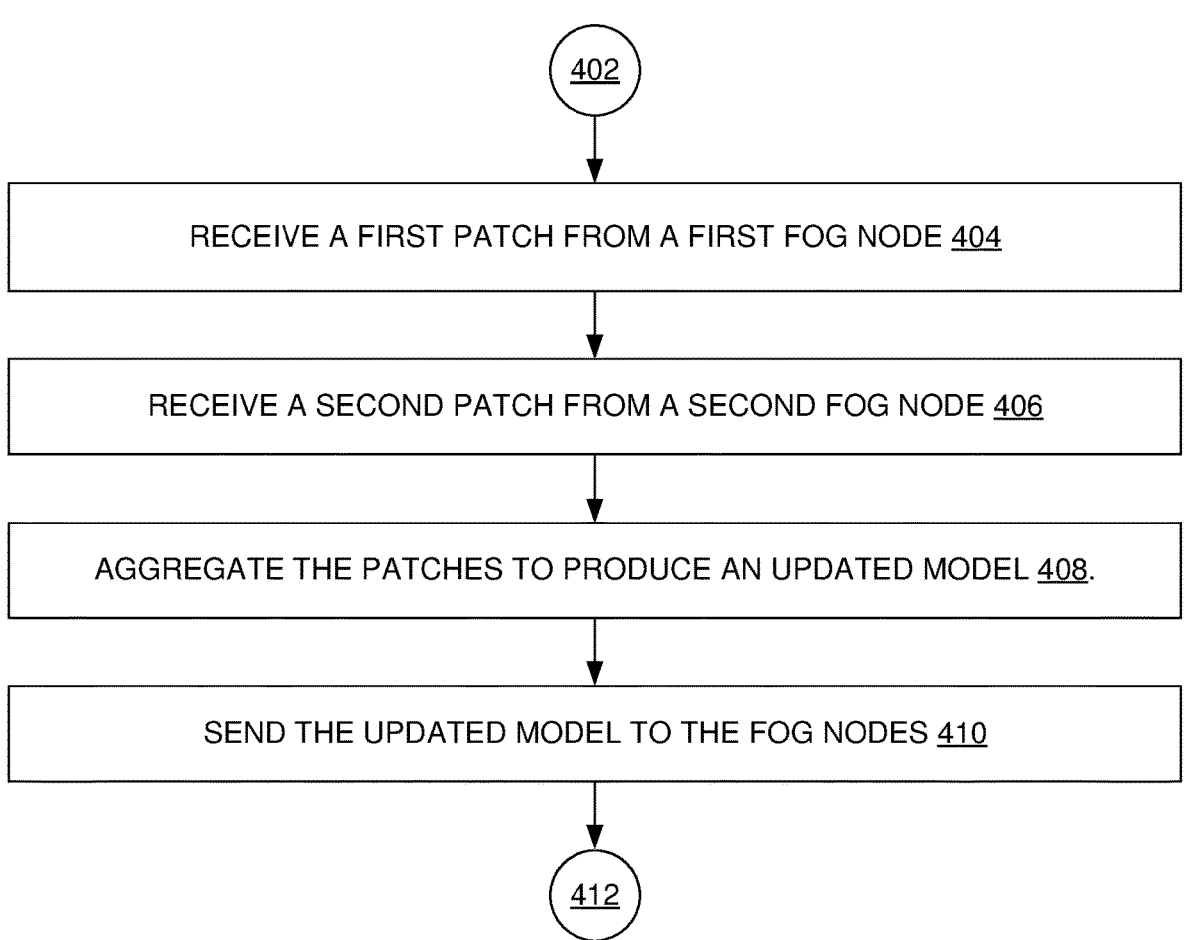
RECEIVE A FIRST PATCH FROM A FIRST FOG NODE 404
RECEIVE A SECOND PATCH FROM A SECOND FOG NODE 406
AGGREGATE THE PATCHES TO PRODUCE AN UPDATED MODEL 408.
SEND THE UPDATED MODEL TO THE FOG NODES 410
FIG. 4

500

502

RECEIVE SENSOR DATA AT A FOG NODE 504

PROCESS THE SENSOR DATA WITH A RBM 506

THE FOG NODE IDENTIFIES A FAULT OR NORMAL CONDITION 508

510

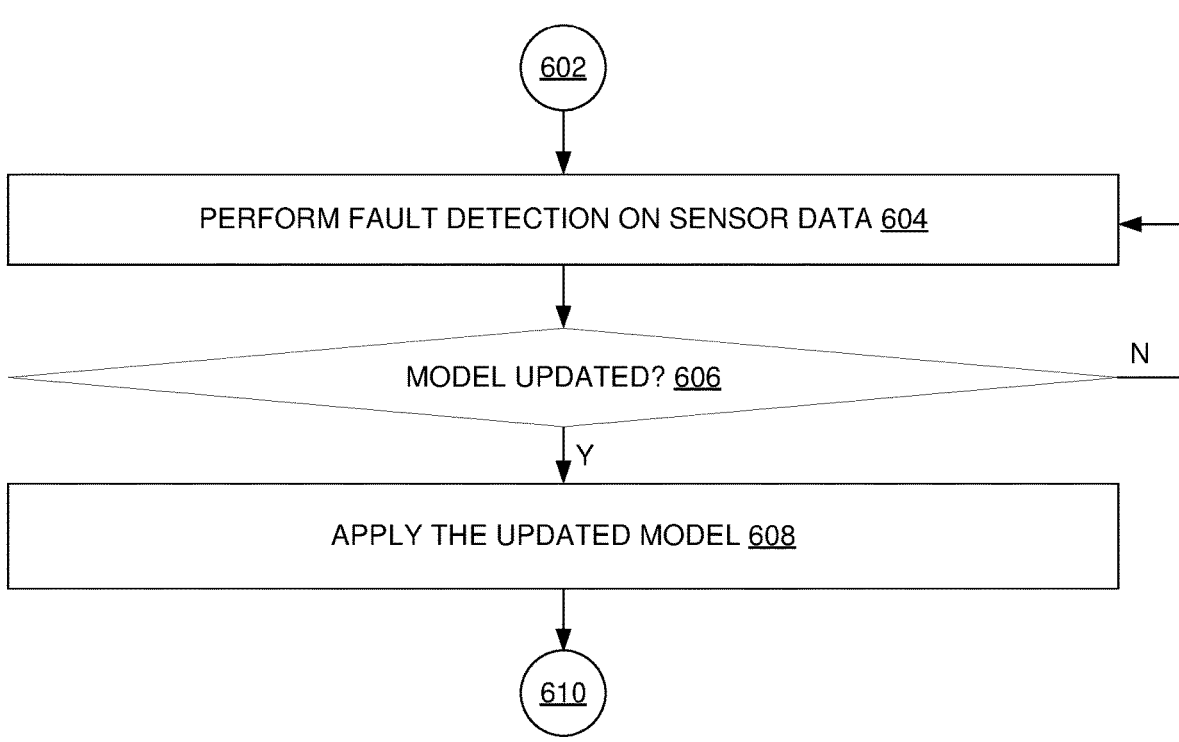
FIG. 6

700

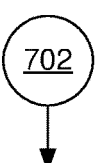
702

RECEIVE, AT A FIRST COMPUTING NODE, SENSOR DATA ABOUT A PHYSICAL ENVIRONMENT FROM AT LEAST ONE SENSOR 704

ANALYZE, BY THE FIRST COMPUTING NODE, THE SENSOR DATA WITH A RBM NEURAL NETWORK TO DETERMINE WHETHER THERE IS A FAULT CONDITION IN THE PHYSICAL ENVIRONMENT, AN IDENTIFICATION OF THE FAULT CONDITION BEING OMITTED FROM DATA USED TO TRAIN THE RBM NEURAL NETWORK 706

UPDATE, BY THE FIRST COMPUTING NODE, THE RBM NEURAL NETWORK BASED ON THE SENSOR DATA TO PRODUCE A FIRST UPDATED RBM NEURAL NETWORK 708

SEND, BY THE FIRST COMPUTING NODE, A FIRST PATCH INDICATIVE OF THE FIRST UPDATED RBM NEURAL NETWORK TO A CENTRAL SERVER 710

RECEIVE, BY THE FIRST COMPUTING NODE AND FROM THE CENTRAL SERVER, INFORMATION INDICATIVE OF A SECOND UPDATED RBM NEURAL NETWORK, THE SECOND UPDATED RBM NEURAL NETWORK BEING BASED ON AN AGGREGATION OF THE FIRST PATCH AND OF A SECOND PATCH GENERATED BY A SECOND COMPUTING NODE 712

714

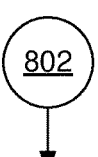

802

ANALYZE, BY A FIRST COMPUTING NODE OF A SYSTEM COMPRISING A PROCESSOR, SENSOR DATA ABOUT A PHYSICAL ENVIRONMENT, THE ANALYZING COMPRISING USING A NEURAL NETWORK TO DETERMINE WHETHER THERE IS A FAULT CONDITION IN THE PHYSICAL ENVIRONMENT 804

UPDATE, BY THE FIRST COMPUTING NODE, THE NEURAL NETWORK BASED ON THE SENSOR DATA TO PRODUCE A FIRST UPDATED NEURAL NETWORK 806

SEND, BY THE FIRST COMPUTING NODE, A FIRST PATCH INDICATIVE OF THE FIRST UPDATED NEURAL NETWORK TO A CENTRAL SERVER 808

RECEIVE, BY THE FIRST COMPUTING NODE AND FROM THE CENTRAL SERVER, INFORMATION INDICATIVE OF A SECOND UPDATED NEURAL NETWORK, THE SECOND UPDATED NEURAL NETWORK BEING BASED ON AN AGGREGATION OF THE FIRST PATCH AND OF A SECOND PATCH GENERATED BY A SECOND COMPUTING NODE 810

900

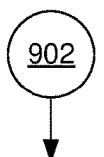

902

ANALYZE SENSOR DATA ABOUT A PHYSICAL ENVIRONMENT COMPRISING INPUTTING THE SENSOR DATA TO A NEURAL NETWORK AND USING AN OUTPUT OF THE NEURAL NETWORK TO DETERMINE WHETHER THERE IS A FAULT CONDITION IN THE PHYSICAL ENVIRONMENT 904

PERFORM FEDERATED LEARNING WITH RESPECT TO THE NEURAL NETWORK
906

SEND A FIRST PATCH INDICATIVE OF LOCAL LEARNING OF THE FEDERATED LEARNING TO A SERVER 908

RECEIVE, FROM THE SERVER, INFORMATION INDICATIVE OF AN UPDATED NEURAL NETWORK, THE UPDATED NEURAL NETWORK BEING BASED ON AN AGGREGATION OF THE FIRST PATCH AND OF A SECOND PATCH GENERATED BY A SECOND FOG NODE 910

DISTRIBUTED FAULT DETECTION

BACKGROUND

Computer systems can experience faults, or disasters. For example, a datacenter can experience a fire, or an earthquake. Information about faults can be determined via one or more sensors.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. A first computing node of a system can receive sensor data about a physical environment from at least one sensor. The first computing node can analyze the sensor data with a restricted Boltzmann machine (RBM) neural network to determine whether there is a fault condition in the physical environment, an identification of the fault condition being omitted from data used to train the RBM neural network. The first computing node can update the RBM neural network based on the sensor data to produce a first updated RBM neural network. The first computing node can send a first patch indicative of the first updated RBM neural network to a central server. The first computing node can receive, from the central server, information indicative of a second updated RBM neural network, the second updated RBM neural network being based on an aggregation of the first patch and of a second patch generated by a second computing node.

An example method can comprise analyzing, by a first computing node of a system comprising a processor, sensor data about a physical environment, the analyzing comprising using a neural network to determine whether there is a fault condition in the physical environment. The method can further comprise updating, by the first computing node, the neural network based on the sensor data to produce a first updated neural network. The method can further comprise sending, by the first computing node, a first patch indicative of the first updated neural network to a central server. The method can further comprise receiving, by the first computing node and from the central server, information indicative of a second updated neural network, the second updated neural network being based on an aggregation of the first patch and of a second patch generated by a second computing node.

An example non-transitory computer-readable medium can comprise instructions that, in response to execution, cause a system comprising a processor to perform operations. These operations can comprise analyzing sensor data about a physical environment comprising inputting the sensor data to a neural network and using an output of the neural network to determine whether there is a fault condition in the physical environment. These operations can further comprise performing federated learning with respect to the neural network. Performing federated learning can comprise sending a first patch indicative of local learning of the federated learning to a server, and receiving, from the server, information indicative of an updated neural network, the updated neural network being based on an aggregation of the first patch and of a second patch generated by a second fog node.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example neural network that can facilitate distributed fault detection, in accordance with an embodiment of this disclosure;

FIG. 4 illustrates an example process flow for a central server updating a fault detection model for multiple fog nodes to facilitate distributed fault detection, in accordance with an embodiment of this disclosure;

FIG. 6 illustrates an example process flow for a fog node iteratively updating its model to facilitate distributed fault detection, in accordance with an embodiment of this disclosure;

FIG. 7 illustrates an example process flow for distributed fault detection, in accordance with an embodiment of this disclosure;

FIG. 8 illustrates another example process flow for distributed fault detection, in accordance with an embodiment of this disclosure;

FIG. 9 illustrates another example process flow for distributed fault detection, in accordance with an embodiment of this disclosure;

DETAILED DESCRIPTION

Overview

Figure 1:
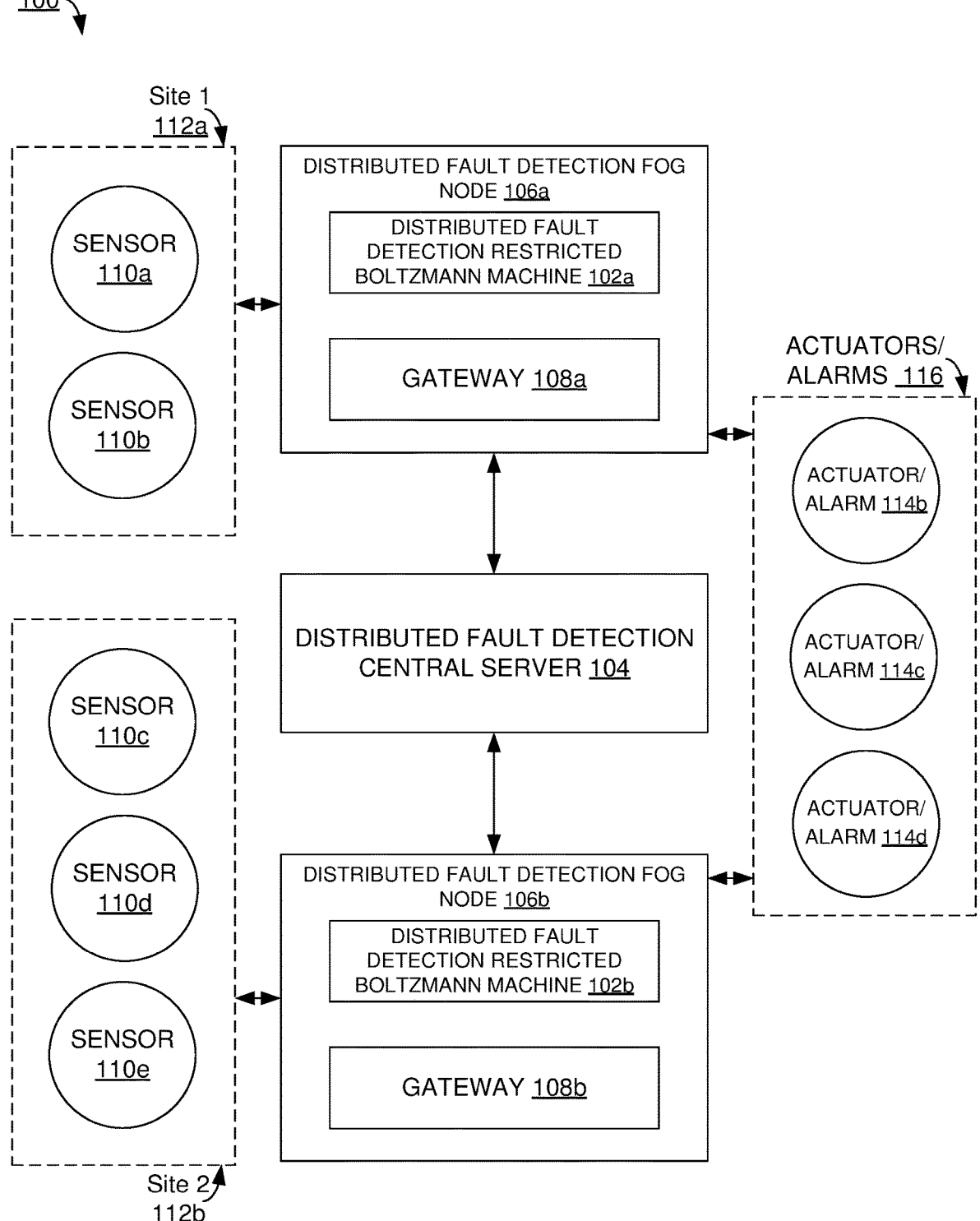
FIG. 1 illustrates an example system architecture that can facilitate distributed fault detection, in accordance with an embodiment of this disclosure.

The present techniques can involve a RBM based fault prevention and/or detection system using federated learning that can be deployed on fog nodes for decentralized quick detection and response in case of system malfunction or fault.

Different approaches can be taken to implement the present techniques, including logistic regression, naïve Bayes, decision tree, and artificial neural network (ANN) approaches for classification tasks that can work well on labeled data. A problem with these other approaches is that they might not be usable when there is not enough input data to train all scenarios where a fault can happen.

In the case of an emergency such as a fire, a response time can be critical, and sending data to a central server for processing can increase a response time due to network delay, and this increased response time can lead to serious damage caused to a system before the emergency is addressed.

Federated learning can generally comprise techniques that aid a model in improving itself over time without putting a large load on a system. In some examples, each RBM model can create a patch according to new data, and send this patch to a central server where the patch can be aggregated. A patch can comprise a set of high dimensional vectors that contain a list of updated weights (which can be expressed as floating point numbers). Data in a patch can be compressed before sending to a server to reduce bandwidth consumption.

The central server can then send an updated model for the RBMs. This approach can help streamline a model training process, where not all data is necessary to start a training process, and, in some examples, where a model can be robust enough to function properly after multiple revisions.

An example implementation of the present techniques can implement a system of sensors, fog nodes with RBMs deployed on them, and actuators (e.g., a component that is configured to move an object, such as open a valve of a fire suppression system) for fault prevention, detection, and handling. An amount of time taken for sensors to transmit data to fog nodes can be less than an amount of time taken for sensors to send that data to a central server, since fog nodes can be positioned at the edge of a network. In some examples, a use of RBMs can remove a need to engineer all fault scenarios to get data points for classification.

In a fog environment, processing can take place in a data hub on a smart device (or a smart router or gateway) on the edge of a network, thus reducing the amount of data sent to the cloud. While edge devices and sensors can be where data is generated and collected, in some examples, they lack compute and storage resources to perform advanced analytics and machine-learning tasks.

Fog computing can be used to improve efficiency and reduce an amount of data transported out of the cloud for processing, analysis, and storage. Fog computing can be implemented to improve efficiency, as well as for security and compliance reasons. The term "fog" computing can be used as a metaphor; where fog is a cloud located close to the ground, similarly, fog computing can be performed at the edge of a cloud network.

Federated learning (FL) can generally comprise an approach that downloads a current model from a central server, and computes an updated patch at the device itself using local data. These locally-trained models can then be sent from the devices back to the central server where they are aggregated (e.g., by averaging weights), and then a single consolidated and improved global model can be sent back to the devices. This approach can ensure that the model distributed across multiple devices is up to date with the new data that is being received from devices.

An example of federated learning according to the present techniques can involve fog nodes processing data to identify faults, and updating their respective model for a set period of time, which can be referred to as an epoch. In some examples, each fog node can use a different set period of time. At the end of the epoch, each fog node can send its updated model weights to a central node (or central server) for aggregation. The central node can average the weights and build a new model, which it distributes to the fog nodes, and this can repeat over time.

This approach can facilitate the fog nodes learning from each other; can involve low communication requirements; and can keep data on the fog node to aid in privacy (where, in some examples, weights of the model are sent to the central node, but sensor data processed by a fog node is not sent to the central node).

Another example of federated learning according to the present techniques can comprise training locally on fog nodes, and then sending the data for each layer of a respective model to a central server to aggregate similar weights. This can differ from the previous example where the weights of each neuron can be averaged.

During a training process, each layer can be sent from a fog node to a central server for aggregation. The central server can inspect neurons in the layers and aggregate similar neurons, or add new neurons to a layer (or remove neurons). The new layer can be sent back to the fog node to replace its current version of the layer.

A problem with prior approaches can be that they need labeled data with all possible fault scenarios. The present techniques can be implemented with less data. For a robust fault detection system, a fault classification model can be trained for all possible fault scenarios. To accomplish that, prior techniques require training data for all of those training scenarios, and, in some examples, acquiring that data is not practical. For example, it might not be practical to get accurate training data that can detect a nuclear meltdown. A technique that utilizes a RBM can be implemented with less data, because they can be implemented using data when a system is in a safe state, rather than also with data when the system is in a fault state.

A problem with other techniques can involve latency in sending sensor data to a central server for fault detection. Sensors can collect data and send it to a central server located on cloud or on-prem for fault detection at regular time intervals. Due to this centralized nature, this approach may not be robust. Where there is a failure at the central server, data cannot be processed.

Sending data to the cloud can exacerbate this problem because of an amount of time involved with transmitting the data, and can cause a delay that can increase a time before a fault can be handled.

The present techniques can provide for collaboration of new data across multiple models without sending all the data to a central server. Some system architectures can be distributed. Data sharing between RBMs can be involved in creating a robust distributed fault detection system. One approach can be to send all new data to a central server, where the central server can retrain the model according to the new data received.

The present techniques can involve using RBMs for fault detection using fog computing. This combination can provide for a decentralized model for handling disaster scenarios. Using RBMs can eliminate a need to collect data for all fault scenarios. Rather, safe state system data can be enough to train a model. That is, it can be detected that a system is going into an unsafe state without having previously encountered such an unsafe state.

In some examples, fog computing can help in distributed fault detection because data does not need to be sent to a central server for classification. Rather, each fog node can have a RBM running on it that can process data at the edge itself.

The present techniques can involve federated learning for RBMs, which can address data-centric problems in distributed fault detection systems. Federated learning can address a data sharing problem among RBMs deployed on different fog nodes. Patch updates can be calculated at individual RBM levels, and sent to a central server for aggregation. The central server can send an updated model back to the RBMs, where this updated model contains data from multiple RBMS. This approach can make models more accurate with each iteration, as more data is available for decision-making.

An example according to the present techniques can be to detect fires in server labs. Sensors can be located in server labs that collect data based on various parameters, like temperature, humidity, and noise. This data can be processed using RBMs. If the model finds a pattern in the data that shows that the system is not in a safe state, the RBM can notify relevant authorities, or take appropriate actions using actuators (such as by causing fire-suppressing foam to be released into the server lab).

Another example according to the present techniques can be to implement decentralized processing for quick response. A use of fog nodes can reduce a latency and increase robustness in a case of an emergency, such as a power outage. Fog nodes can be battery operated, and can work with minimal power. Where a central server fails, fog nodes can still operate on their own, and decide upon a solution for a fault.

Example Architectures

FIG. 1 illustrates an example system architecture 100 that can facilitate distributed fault detection, in accordance with an embodiment of this disclosure. System architecture comprises distributed fault detection (DFD) central server 104, DFD fog node 106*a*, DFD fog node 106*b*, site 1 112*a*, site 2 112*b*, and actuators/alarms 116.

In turn, some of these components comprise other components. DFD fog node 106*a* comprises DFD RBM 102*a* and gateway 108*a*. DFD fog node 106*b* comprises DFD RBM 102*b* and gateway 108*b*. Site 1 112*a* comprises sensor 110*a* and sensor 110*b*. Site 2 112*b* comprises sensor 110*c*, sensor 110*d*, and sensor 110*e*. Actuators/alarms 116 comprises actuator/alarm 114*a*, actuator/alarm 114*b*, and actuator/alarm 114*c*.

Figure 10:
FIG. 10 illustrates an example block diagram of a computer operable to execute an embodiment of this disclosure.

In some examples, each of DFD central server 104, DFD fog node 106*a*, and DFD fog node 106*b* can be implemented with one or more instances of computer 1002 of FIG. 10.

Each of gateway 108*a* and gateway 108*b* can comprise computer networking hardware that can route data between their respective DFD fog node and site, and between their respective DFD fog node and DFD central server 104.

Figure 3:
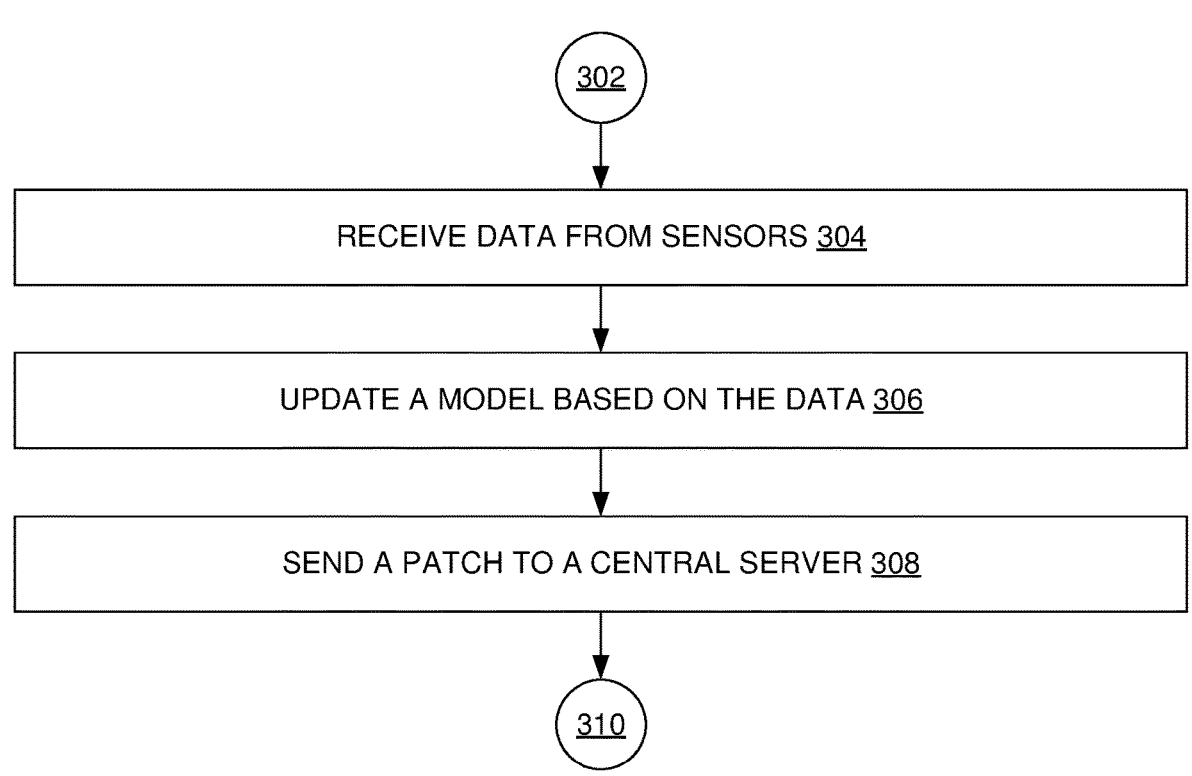
FIG. 3 illustrates an example process flow for a fog node updating its fault detection model to facilitate distributed fault detection, in accordance with an embodiment of this disclosure.
Figure 5:
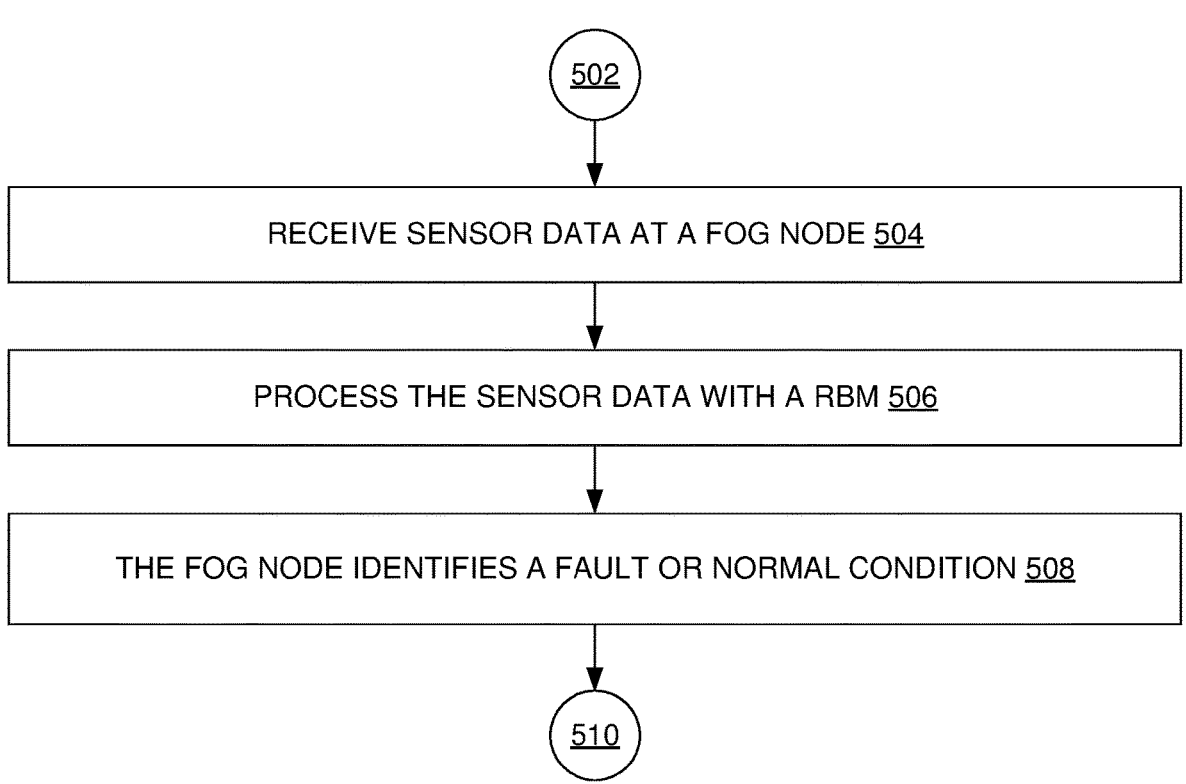
FIG. 5 illustrates an example process flow for a fog node identifying a state of a system to facilitate, in accordance with an embodiment of this disclosure.

Each of DFD RBM 102*a* and DFD RBM 102*b* can comprise a RBM that can implement part(s) of process flow 300 of FIG. 3, process flow 500 of FIG. 5, process flow 600 of FIG. 6, process flow 700 of FIG. 7, process flow 800 of FIG. 8, and/or process flow 900 of FIG. 9.

Each of sensor 110*a*, sensor 110*b*, sensor 110*c*, sensor 110*d*, and sensor 110*e* can comprise an electronic sensor that gathers information about an environment in which the sensor is physically located—e.g., temperature, humidity, or sound level.

Site 1 112*a* and site 2 112*b* can each comprise a physical location (e.g., a data center).

Actuator 114*a*, actuator 114*b*, and actuator 114*c* can each comprise a component that can move a physical object— e.g., open a valve for a fire suppression system that releases water or fire-suppressing foam into an area.

DFD RBM 102*a* can monitor sensors 110*a* and sensors 110*b* to determine whether a fault has occurred at site 1 112*a*. Where DFD RBM 102*a* identifies a fault, DFD RBM 102*a* can raise an alert to an administrator of site 1 112*a*, and/or engage one or more actuators or alarms of actuators/ alarms 116 that can mitigate against the detected fault.

In identifying a fault, DFD RBM 102*a* can use a DFD model that DFD RBM 102*a* can update based on data received from sensor 110*a* and sensor 110*b*. DFD RBM 102*a* can send a patch to DFD central server 104, which can aggregate patches from multiple DFD RBMs (e.g., DFD RBM 102*a* and DFD RBM 102*b*) to determine an updated model, and send the updated model to each DFD RBM.

In this manner, fault detection can occur at a fog node edge (e.g., by DFD fog node 106*a*) to increase speed of fault detection compared to fault detection at a central location. Then, federated updating of a model can still benefit from data from multiple DFD RBMs, where updated models are processed by a central server (e.g., DFD central server 104).

FIG. 2 illustrates an example neural network 200 that can facilitate distributed fault detection, in accordance with an embodiment of this disclosure. Neural network 200 comprises DFD RBM 202*a*, which can be similar to DFD RBM 102*a* of FIG. 1. In turn, DFD RBM 202*a* comprises visible layer 204 and hidden layer 206.

Visible layer 204 comprises three nodes—node $X_1$ 208*a*, node $X_2$ 208*b*, and node $X_3$ 208*c*. Visible layer 204 can be referred to as "visible" because the inputs to (or outputs from) the layer can be observed by an external system.

Hidden layer 206 comprises two nodes—node $H_1$ 210*a* and node $H_2$ 210*b*. Hidden layer 206 can be referred to as "hidden" because its inputs and outputs are not visible to an external system, but are internal to the neural network.

The weights of inputs to various nodes are expressed as $W_{11}$, $W_{12}$, $W_{21}$, $W_{22}$, $W_{31}$, and $W_{32}$.

A BRM can generally comprise a generative stochastic ANN that can learn a probability distribution over its set of inputs. In some examples, RBMs work in scenarios where it is difficult to get data for an unsafe state of the system. A RBM can learn how the system works in the normal states through a given set of inputs, and can identify when the current state of the system is not a safe state and where a fault can occur due to the current unsafe state.

The following can be some example properties of a RBM. In a RBM node can be connected to every other node. The connection between all nodes can be unidirectional. In examples, in RBMs, there is no intra-layer connection between the visible nodes, and there is also no intra-layer connection between the hidden nodes. Rather, in these examples, there are connections only between input and hidden nodes. Since RBMs can restrict an intra-layer connection, they are referred to as "Restricted" Boltzmann Machines.

In a forward pass, a RBM can take inputs and translate them into a set of numbers that encode the inputs. In a backward pass, the RBM can take this set of numbers and translates them back to form the re-constructed inputs. Through several forward and backward passes, a RBM can trained to reconstruct the input data.

In neural network 200 during a forward pass, the following can be true:

$$h_1^t = f\left(w_{11}x_1^{t-1} + w_{21}x_2^{t-1} + w_{31}x_3^{t-1} + b_1\right)$$

$$h_2^t = f\left(w_{12}x_1^{t-1} + w_{22}x_2^{t-1} + w_{32}x_3^{t-1} + b_2\right)$$

In neural network 200 during a backward pass, the following can be true:

$$x_1^t = f\left(w_{11}h_1^{t-1} + w_{21}h_2^{t-1} + a_1\right)$$

$$x_2^t = f\left(w_{12}h_1^{t-1} + w_{22}h_2^{t-1} + a_2\right)$$

$$x_3^t = f\left(w_{13}h_1^{t-1} + w_{23}h_2^{t-1} + a_3\right)$$

Example Process Flows

FIG. 3 illustrates an example process flow 300 for a fog node updating its fault detection model to facilitate distributed fault detection, in accordance with an embodiment of this disclosure. In some examples, one or more embodiments of process flow 300 can be implemented by distributed fault detection fog node 106*a* of FIG. 1, or computing environment 1000 of FIG. 10.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 300 begins with 302, and moves to operation 304. Operation 304 depicts receiving data from sensors. This sensor data can be obtained from the physical environment by one or more sensors, and can include information such as temperature, air quality, and whether water is present. After operation 304, process flow 300 moves to operation 306.

Operation 306 depicts updating a model based on the data. A fog node can locally update its own model used for fault detection based on the sensor data that it receives and processes to identify faults. After operation 306, process flow 300 moves to operation 308.

Operation 308 depicts sending a patch to a central server. This patch can comprise the updated model determined by the fog node in operation 306, and can include updated values for weights of inputs in a neural network of the model. The central server can use this information, along with similar information from other fog nodes, to further update a model, and send this further updated model back to those fog nodes. After operation 308, process flow 300 moves to 310, where process flow 300 ends.

FIG. 4 illustrates an example process flow 400 for a central server updating a fault detection model for multiple fog nodes to facilitate distributed fault detection, in accordance with an embodiment of this disclosure. In some examples, one or more embodiments of process flow 400 can be implemented by distributed fault detection central server 104 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404. Operation 404 depicts receiving a first patch from a first fog node. This can comprise the server receiving the patch generated by a fog node in operation 308. After operation 404, process flow 400 moves to operation 406.

Operation 406 depicts receiving a second patch from a second fog node. This can comprise the server receiving—relative to operation 404—another patch generated by another fog node in another instance of operation 408. After operation 406, process flow 400 moves to operation 408.

Operation 408 depicts aggregating the patches to produce an updated model. In some examples, the patches can comprise values for weights in a neural network. Aggregating the patches can comprise aggregating respective values that correspond to a particular weight, such as by averaging them, or performing a weighted average of them. After operation 408, process flow 400 moves to operation 410.

Operation 410 depicts sending the updated model to the fog nodes. This can comprise the server sending these updated values of weights back to the fog nodes, which can then update their models using these updated values, and process new sensor data for faults using these updated models. After operation 410, process flow 400 moves to 412, where process flow 400 ends.

FIG. 5 illustrates an example process flow 500 for a fog node identifying a state of a system to facilitate, in accordance with an embodiment of this disclosure. In some examples, one or more embodiments of process flow 500 can be implemented by distributed fault detection fog node 106*a* of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504. Operation 504 depicts receiving sensor data at a fog node. This sensor data can be obtained from the physical environment by one or more sensors, and can include information such as temperature, air quality, and whether water is present. After operation 504, process flow 500 moves to operation 506.

Operation 506 depicts processing the sensor data with a RBM. In some examples, the RBM can process the sensor data to determine whether a fault is detected in the physical environment, such as that there is a flood where the sensors are stored (e.g., in a data center). After operation 506, process flow 500 moves to operation 508.

Operation 508 depicts the fog node identifying a fault or normal condition. Where the fog node identifies a fault from the data processed in operation 506, it can determine that a fault is present. Similarly, where the fog node identifies a normal condition from the data processed in operation 506, it can determine that a fault is not present.

After operation 508, process flow 500 moves to 510, where process flow 500 ends.

FIG. 6 illustrates an example process flow 600 for a fog node iteratively updating its model to facilitate distributed fault detection, in accordance with an embodiment of this disclosure. In some examples, one or more embodiments of process flow 600 can be implemented by distributed fault detection fog node 106*a* of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604. Additionally, operation 604 is reached from operation 606 where it is determined that the model is not updated, or from operation 608. Operation 604 depicts performing fault detection on sensor data. This can comprise a fog node analyzing sensor data to determine whether there is a fault based on a current version of its RBM model that it uses to facilitate fault detection. After operation 604, process flow 600 moves to operation 606.

Operation 606 depicts determining whether the model is updated. In some examples, this can comprise determining whether either a new model has been generated locally, or whether an updated model has been received from a central server. Where it is determined in operation 606 that the model is updated, operation 606 moves to operation 608. Instead, where it is determined in operation 606 that the model is not updated, operation 606 returns to operation 604.

Operation 608 is reached from operation 606 where it is determined that the model is updated. Operation 608 depicts applying the updated model. In some examples, this can comprise replacing values of weights in a pre-existing model with updated values for weights (without changing the number of nodes, or the connections between nodes, in the model). After operation 608, process flow 600 returns to operation 604.

In this manner, process flow 600 can be implemented to iteratively update a model that is being used to perform fault detection on sensor data.

FIG. 7 illustrates an example process flow 700 for distributed fault detection, in accordance with an embodiment of this disclosure. In some examples, one or more embodiments of process flow 700 can be implemented by distributed fault detection fog node 106a of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704. Operation 704 depicts receiving, at a first computing node, sensor data about a physical environment from at least one sensor. That is, a fog node can receive sensor data. After operation 704, process flow 700 moves to operation 706.

Operation 706 depicts analyzing, by the first computing node, the sensor data with a RBM neural network to determine whether there is a fault condition in the physical environment, an identification of the fault condition being omitted from data used to train the RBM neural network. That is, the fog node can use a RBM to analyze the sensor data for a fault condition. After operation 706, process flow 700 moves to operation 708.

Operation 708 depicts updating, by the first computing node, the RBM neural network based on the sensor data to produce a first updated RBM neural network. That is, the fog node also updates its RBM model based on that sensor data. After operation 708, process flow 700 moves to operation 710.

Operation 710 depicts sending, by the first computing node, a first patch indicative of the first updated RBM neural network to a central server. That is, the fog node can send a patch to a central server. After operation 710, process flow 700 moves to operation 712.

Operation 712 depicts receiving, by the first computing node and from the central server, information indicative of a second updated RBM neural network, the second updated RBM neural network being based on an aggregation of the first patch and of a second patch generated by a second computing node. That is, the central server can send the fog node an updated RBM model based on aggregating patches from multiple fog nodes.

In some examples, operation 712 comprises analyzing, by the first computing node, second sensor data with the second updated RBM neural network to determine whether there is the fault condition in the physical environment. That is, the fog node can use the updated model received from a central server to process new sensor data.

In some examples, the central server is unreachable by the first computing node when the first computing node performs the analyzing of the second sensor data. That is, the fog node can continue to perform fault detection even when the central server is down.

In some examples, the fault condition is omitted from training data used to train the second updated RBM neural network. That is, in some examples, the RBM does not need to be trained on with data for a specific fault condition to later identify that specific fault condition (e.g., a RBM could identify an earthquake fault condition without having been trained with data that corresponds to earthquakes).

In some examples, a first amount of time to analyze the second sensor data by the first computing node is less than a second amount of time to send the second sensor data to the central server and receive a result from the central server indicative of whether there is the fault condition in the physical environment. That is, it can be faster for a fog node to perform fault detection compared to sending data up to a central server to perform fault detection.

In some examples, operation 712 comprises iteratively updating the second updated RBM neural network. That is, the RBM model can be periodically updated over time, for an indefinite number of updates.

In some examples, the second updated RBM neural network comprises an average of first neural network weights of the first patch and of second neural network weights of the second patch. That is, an example way for the central server to aggregate the patches is to average weights for inputs in the neural network that are expressed in the patches.

After operation 712, process flow 700 moves to 714, where process flow 700 ends.

FIG. 8 illustrates another example process flow 800 for distributed fault detection, in accordance with an embodiment of this disclosure. In some examples, one or more embodiments of process flow 800 can be implemented by distributed fault detection fog node 106a of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804. Operation 804 depicts analyzing, by a first computing node of a system comprising a processor, sensor data about a physical environment, the analyzing comprising using a neural network to determine whether there is a fault condition in the physical environment. In some examples, operation 804 can be implemented in a similar manner as operation 706 of FIG. 7.

In some examples, the neural network comprises a RBM. In some examples, the neural network comprises a stochastic recurrent neural network that omits intralayer connections between nodes.

After operation 804, process flow 800 moves to operation 806.

Operation 806 depicts updating, by the first computing node, the neural network based on the sensor data to produce a first updated neural network. In some examples, operation 806 can be implemented in a similar manner as operation 808 of FIG. 7. After operation 806, process flow 800 moves to operation 808.

Operation 808 depicts sending, by the first computing node, a first patch indicative of the first updated neural network to a central server. In some examples, operation 808 can be implemented in a similar manner as operation 710 of FIG. 7. After operation 808, process flow 800 moves to operation 810.

Operation 810 depicts receiving, by the first computing node and from the central server, information indicative of a second updated neural network, the second updated neural network being based on an aggregation of the first patch and of a second patch generated by a second computing node. In some examples, operation 810 can be implemented in a similar manner as operation 712 of FIG. 7.

In some examples, operation 810 comprises, in response to determining, by the first computing node and using the second updated neural network, that second sensor data is indicative of the fault condition in the physical environment, raising an alert. Raising an alert can comprise sending a message to a user account associated with an administrator of the first computing node.

In some examples, operation 810 comprises, in response to determining, by the first computing node and using the second updated neural network, that second sensor data is indicative of the fault condition in the physical environment, engaging an actuator to cause a physical change to the physical environment that mitigates against the fault condition. That is, the fault condition can be mitigated by causing a physical action to be performed, such as opening an actuator valve that controls water flow through a fire suppressant sprinkler system. In some examples, the first computing node is configured to engage the actuator, and wherein a third computing node that stores a copy of the second updated neural network is configured to engage the actuator. That is, multiple fog nodes can be configured to control the same actuator.

In some examples, the physical environment is a first physical environment, and wherein a third computing node uses the second updated neural network to determine whether there is the fault condition in a second physical environment. That is, multiple fog nodes can use an updated model from a central server.

After operation 810, process flow 800 moves to 812, where process flow 800 ends.

FIG. 9 illustrates another example process flow 900 for distributed fault detection, in accordance with an embodiment of this disclosure. In some examples, one or more embodiments of process flow 900 can be implemented by distributed fault detection fog node 106a of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904. Operation 904 depicts analyzing sensor data about a physical environment comprising inputting the sensor data to a neural network and using an output of the neural network to determine whether there is a fault condition in the physical environment. In some examples, operation 904 can be implemented in a similar manner as operation 706 of FIG. 7.

In some examples, operations 904 (and operations 906-908) can be performed by a first fog node that is located at an edge of a network that comprises the server.

In some examples, the first fog node is configured to analyze second sensor data with the updated neural network in response to the server being unreachable by the first fog node. That is, the fog node can perform fault detection locally even when it cannot communicate with a central server (which can be down).

In some examples, the fault condition is omitted from training data used to train the updated neural network. That is, it can be that the neural network can identify faults that are not present in its training data, such as data on earthquakes.

In some examples, a first amount of time associated with analyzing the sensor data by the first fog node is shorter than a second amount of time associated with analyzing the sensor data by the server. That is, it can be faster for a fog node to analyze sensor data locally to identify faults than to send the data up to a central server for fault analysis.

After operation 904, process flow 900 moves to operation 906.

Operation 906 depicts performing federated learning with respect to the neural network. In some examples, operation 906 can be implemented in a similar manner as operation 706-712 of FIG. 7.

In some examples, the performing the federated learning comprises determining a locally-trained updated neural network. That is, federated learning can comprise some learning being performed locally on a fog node, and some learning being performed on a central server. Operation 906 comprises operations 908-910.

Operation 908 depicts sending a first patch indicative of local learning of the federated learning to a server. In some examples, operation 908 can be implemented in a similar manner as operation 710 of FIG. 7. After operation 908, process flow 900 moves to operation 910.

Operation 910 depicts receiving, from the server, information indicative of an updated neural network, the updated neural network being based on an aggregation of the first patch and of a second patch generated by a second fog node. In some examples, operation 910 can be implemented in a similar manner as operation 712 of FIG. 7. After operation 904, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of distributed fault detection fog node 106*a*, distributed fault detection fog node 106*b*, and/or distributed fault detection central server 104 of FIG. 1.

In some examples, computing environment 1000 can implement one or more embodiments of the process flows of FIGS. 3-9 to facilitate distributed fault detection.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 (containing disk 1022) can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

receiving, at a first computing node, first sensor data about a physical environment that is external to the system from at least one sensor;

analyzing, by the first computing node, the first sensor data with a restricted Boltzmann machine (RBM) neural network to determine whether there is a fault condition in the physical environment that is external to the system, wherein data used to train the RBM neural network comprises an identification of a safe state of the physical environment that is external to the system and omits an identification of the fault condition;

updating, by the first computing node, the RBM neural network based on the first sensor data to produce a first updated RBM neural network;

sending, by the first computing node, a first patch indicative of the first updated RBM neural network to a central server;

receiving, by the first computing node and from the central server, information indicative of a second updated RBM neural network, the second updated RBM neural network being based on an aggregation of the first patch and of a second patch generated by a second computing node, wherein the aggregation comprises combining neurons of the first patch that satisfy a similarity criterion with respect to neuron weight;

analyzing, by the first computing node, second sensor data with the second updated RBM neural network to determine whether there is the fault condition in the physical environment that is external to the system; and in response to determining, by the first computing node and using the second updated neural network, that the second sensor data is indicative of the fault condition in the physical environment, generating an alert, and engaging an actuator to cause a physical change to the physical environment that mitigates the fault condition, wherein the first computing node is configured to engage the actuator independently of communicating with a centralized module, wherein a third computing node that stores a copy of the second updated neural network is configured to engage the actuator independently of the communicating with the centralized module and based on the third computing node identifying the fault condition, and wherein the engaging of the actuator is separate from the generating of the alert.

2. The system of claim 1, wherein the central server is unreachable by the first computing node when the first computing node performs the analyzing of the second sensor data.

3. The system of claim 1, wherein the fault condition is omitted from training data used to train the second updated RBM neural network.

4. The system of claim 1, wherein a first amount of time to analyze the second sensor data by the first computing node is less than a second amount of time to send the second sensor data to the central server and receive a result from the central server indicative of whether there is the fault condition in the physical environment.

5. The system of claim 1, wherein the operations further comprise:

iteratively updating the second updated RBM neural network.

6. The system of claim 1, wherein the second updated RBM neural network comprises an average of first neural network weights of the first patch and of second neural network weights of the second patch.

7. The system of claim 1, wherein the aggregation comprises adding a neuron from a layer of the first updated RBM neural network.

8. A method, comprising:

analyzing, by a first computing node of a system comprising at least one processor, sensor data about a physical environment that is external to the system, the analyzing comprising using a neural network to determine whether there is a fault condition in the physical environment that is external to the system;

updating, by the first computing node, the neural network based on the sensor data to produce a first updated neural network;

sending, by the first computing node, a first patch indicative of the first updated neural network to a central server;

receiving, by the first computing node and from the central server, information indicative of a second updated neural network, the second updated neural network being based on an aggregation of the first patch and of a second patch generated by a second computing node, wherein the aggregation comprises combining neurons of the first patch that satisfy a similarity criterion with respect to neuron weight;

analyzing, by the first computing node, second sensor data with the second updated neural network to determine whether there is the fault condition in the physical environment that is external to the system; and in response to determining, by the first computing node and using the second updated neural network, that the second sensor data is indicative of the fault condition in the physical environment, rendering, by the system, an alert, and engaging, by the first computing node, an actuator to cause a physical change to the physical environment that mitigates the fault condition, wherein the first computing node is configured to engage the actuator independently of communicating with a central module, wherein a third computing node that stores a copy of the second updated neural network is configured to engage the actuator independently of the communicating with the central module and based on the third computing node identifying the fault condition, and wherein the engaging of the actuator is separate from the rendering of the alert.

9. The method of claim 8, wherein the neural network comprises a restricted Boltzmann machine.

10. The method of claim 8, wherein the neural network comprises a stochastic recurrent neural network that omits intralayer connections between nodes.

11. The method of claim 8, wherein the physical environment is a first physical environment, and wherein the third computing node uses the second updated neural network to determine whether there is the fault condition in a second physical environment.

12. A non-transitory computer-readable medium comprising instructions that, in response to execution, cause a system comprising at least one processor of a first fog node to perform operations, comprising:

analyzing sensor data about a physical environment that is external to the system comprising inputting the sensor data to a neural network and using an output of the neural network to determine whether there is a fault condition in the physical environment that is external to the system;

performing federated learning with respect to the neural network, comprising:

sending a first patch indicative of local learning of the federated learning to a server; and receiving, from the server, information indicative of an updated neural network, the updated neural network being based on an aggregation of the first patch and of a second patch generated by a second fog node, wherein the aggregation comprises combining neurons of the first patch that satisfy a similarity criterion with respect to neuron weight;

analyzing, by the first fog node, second sensor data with the updated neural network to determine whether there is the fault condition in the physical environment that is external to the system; and in response to determining, by the first fog node and using the second updated neural network, that the second sensor data is indicative of the fault condition in the physical environment, raising an alert, and engaging an actuator to cause a physical change to the physical environment that mitigates the fault condition, wherein the first fog node is configured to engage the actuator independently of communicating with a centralized component, wherein a third fog node that stores a copy of the second updated neural network is configured to engage the actuator independently of the communicating with the centralized component and based on the third fog node identifying the fault condition, and wherein the engaging of the actuator is separate from the raising of the alert.

13. The non-transitory computer-readable medium of claim 12, the performing the federated learning comprises:

determining a locally-trained updated neural network.

14. The non-transitory computer-readable medium of claim 12, wherein the first fog node is located at an edge of a network that comprises the server.

15. The non-transitory computer-readable medium of claim 12, wherein the first fog node is configured to analyze second sensor data with the updated neural network in response to the server being unreachable by the first fog node.

16. The non-transitory computer-readable medium of claim 12, wherein the fault condition is omitted from training data used to train the updated neural network.

17. The non-transitory computer-readable medium of claim 12, wherein a first amount of time associated with analyzing the sensor data by the first fog node is shorter than a second amount of time associated with analyzing the sensor data by the server.

18. The non-transitory computer-readable medium of claim 12, wherein a central server is unreachable by the first fog node when the first fog node performs the analyzing of the second sensor data.

19. The non-transitory computer-readable medium of claim 12, wherein the fault condition is omitted from training data used to train the second updated neural network.

20. The non-transitory computer-readable medium of claim 12, wherein a first amount of time to analyze the second sensor data by the first fog node is less than a second amount of time to send the second sensor data to a central server and receive a result from the central server indicative of whether there is the fault condition in the physical environment.

\* \* \* \* \*